United States Patent [19]

Johnson et al.

[11] Patent Number: 5,384,850
[45] Date of Patent: Jan. 24, 1995

[54] SECURITY APPARATUS AND SYSTEM FOR RETAIL ENVIRONMENTS

[75] Inventors: William S. Johnson, Jamestown; Edward A. Payne; Donald A. Boschker; Benita W. Phipps, all of Greensboro, N.C.

[73] Assignee: Gilbarco, Greensboro, N.C.

[21] Appl. No.: 980,503

[22] Filed: Nov. 23, 1992

Related U.S. Application Data

[62] Division of Ser. No. 663,725, Feb. 28, 1991, Pat. No. 5,228,084.

[51] Int. Cl.$^6$ .............................................. H04L 9/00
[52] U.S. Cl. ...................................................... 380/52
[58] Field of Search ............................................. 380/52

[56] References Cited

U.S. PATENT DOCUMENTS

| Re. 32,985 | 7/1989 | Nagata et al. |  |
|---|---|---|---|
| 3,786,421 | 1/1974 | Wostl et al. |  |
| 4,369,442 | 1/1983 | Werth et al. |  |
| 4,395,626 | 7/1983 | Barker et al. |  |
| 4,424,414 | 1/1984 | Hellman et al. |  |
| 4,575,719 | 3/1986 | Bertagna et al. |  |
| 4,593,384 | 6/1986 | Kleinje | 380/52 |
| 4,594,663 | 6/1986 | Nagata et al. |  |
| 4,691,350 | 9/1987 | Kleijne et al. | 380/52 |
| 4,731,841 | 3/1988 | Rosen et al. |  |
| 4,747,049 | 4/1988 | Richardson et al. |  |
| 4,755,940 | 7/1988 | Brachtl et al. |  |
| 4,771,461 | 9/1988 | Matyas |  |
| 4,797,920 | 1/1989 | Stein |  |
| 4,860,351 | 8/1989 | Weingart | 380/52 |
| 4,868,376 | 9/1989 | Lessin et al. |  |
| 4,882,779 | 11/1989 | Rahtgen |  |
| 4,885,777 | 12/1989 | Takaragi et al. |  |
| 4,908,499 | 3/1990 | Guion |  |
| 4,912,762 | 3/1990 | Lee et al. |  |
| 4,962,531 | 10/1990 | Sipman et al. |  |
| 5,117,457 | 5/1992 | Comerford et al. | 380/52 |
| 5,159,629 | 10/1992 | Double et al. | 380/52 |

OTHER PUBLICATIONS

"A Method for Obtaining Digital Signatures and Public-Key Cryptosystems.", Rivest et al., *Communication of the ACM*, Feb. 1978, V21N pp. 120–126.

"The Art of Computer Programming" V2: Seminumerical Algorithms, Knuth, 1969.

"The First Ten Years of Public Key Cryptography", Diffie, *Proceedings of the IEEE*, V6N5, May 1988 pp. 560–577.

*Primary Examiner*—David C. Cain
*Attorney, Agent, or Firm*—Rhodes, Coats & Bennett

[57] ABSTRACT

A gasoline service station includes gasoline dispensers and a PIN pad including keypads for receiving personal identification numbers and assembled into a network for securely communicating personal identification numbers from the PIN pads and dispensers to a host computer over unsecured data lines. The PIN pads and dispensers each include means for encryption and outputting of personal identification numbers. A security module includes means for decryption of data associated with each PIN pad and dispenser in a process for the respective PIN pads and dispensers and means for encryption of data associated with the host computer in a process which is different from its decryption of data associated with the PIN pads and dispensers. A site controller, which is not secure from unauthorized signal detection, has means for directing encrypted data received from the PIN pads and the dispensers to the security module and from the security module to the dispensers or the host computer as needed for properly directing encrypted data to a desired destination.

20 Claims, 6 Drawing Sheets

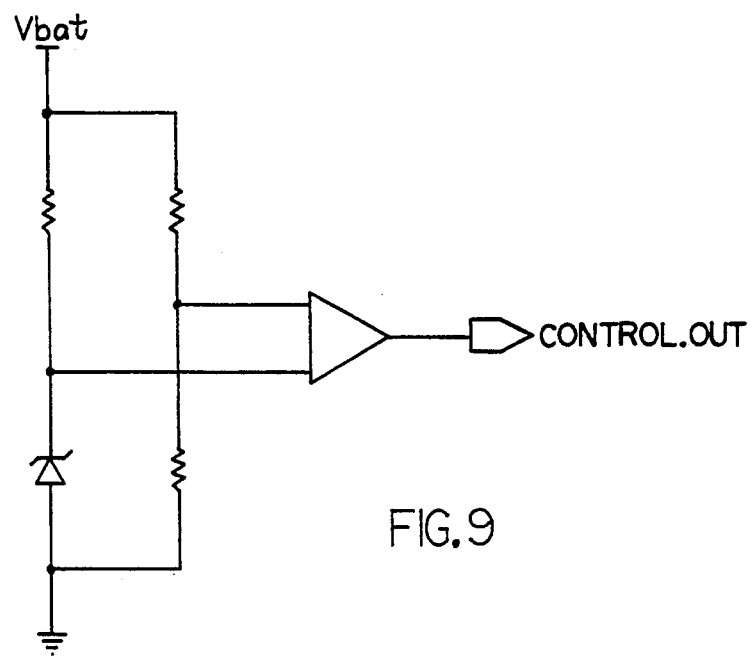
FIG. 9
FIG. 10
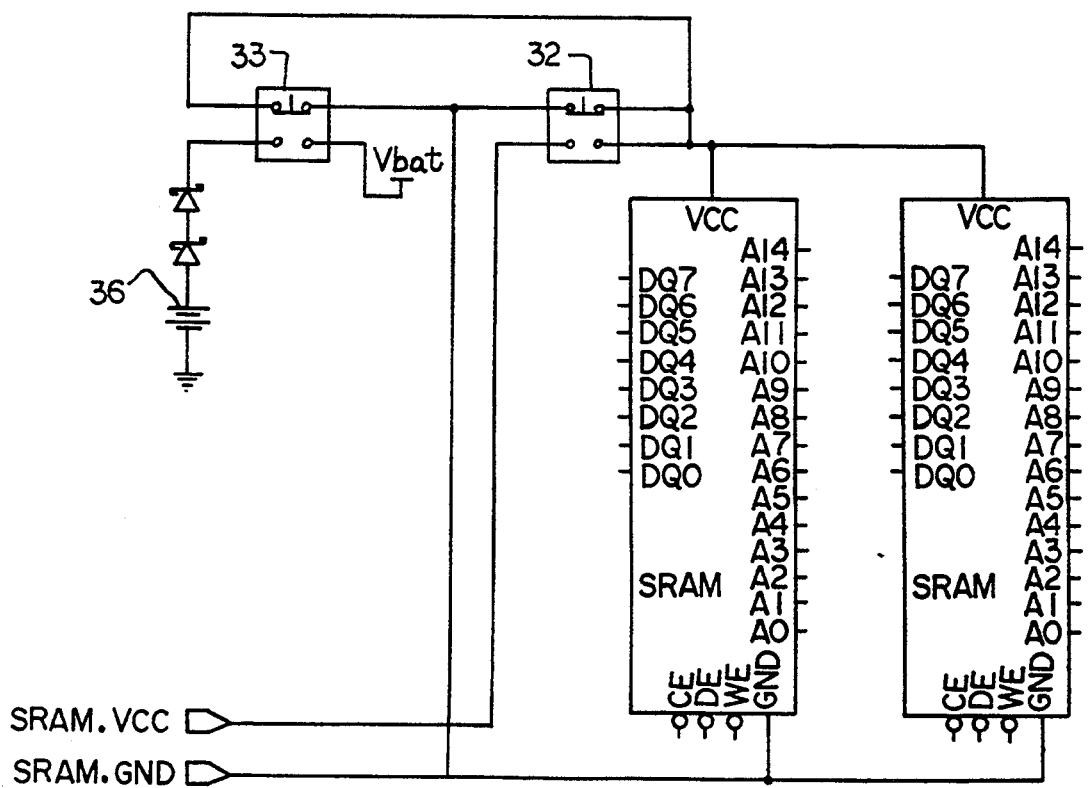

SECURITY APPARATUS AND SYSTEM FOR RETAIL ENVIRONMENTS

This application is a division, of application Ser. No. 663,725, filed Feb. 28, 1991, U.S. Pat. No. 5,228,084 issued Jul. 13, 1993.

BACKGROUND OF THE INVENTION

In retail environments such as stores and service stations, there is a need for maintaining security of customer entered Personal Identification Numbers (PINs). This is especially true in Gasoline Service Stations where the customer may initiate the sale of the product by inserting a magnetic strip credit or debit card (or other type of card) into a card reader which is mounted on a gasoline dispenser, or perhaps elsewhere in a service station. The customer then enters a PIN number via a keypad. The PIN is transmitted along with data read from the magnetic strip to a host computer which can compare the PIN and data from the card to authorize a purchase.

The PIN must be protected from disclosure so that unauthorized persons may not use the PIN in conjunction with the card to defraud either the legitimate card holder, the vendor or an authorizing financial institution or card issuer. In some service station circumstances the customer is requested to enter his/her PIN number in a keypad which is a part of the dispenser housing. Alternatively, he/she may enter the number into a special purpose PIN pad (commercially available from several different companies), when the sale is controlled from a point of sale console. It is desirable, and required in most instances, that the PIN number be encrypted at the point of entry so that no transmissions of the clear text (i.e. not encrypted) PIN occur across any transmission medium that is subject to interception. Thus, it is desirable to use encryption techniques in the PIN pads and in the dispensers if they are such points of entry. Typically, the PIN pads and/or dispensers must be injected with cryptographic keys which are used in the encryption process for exchange of PIN data.

The injection must be done in a secure environment because the cryptographic keys must be initially loaded into PIN pads or dispensers in their clear text form and are therefore subject to interception. PIN pads are small, easily replaceable, and easily injected with cryptographic keys in a secure environment. However, this is not true of dispensers because they require periodic service, which cause them to lose their key data and necessitate another injection process. Since the dispensers are bulky, the removal of the dispenser and shipment to a secure environment for re-keying are impractical. Installing separate, replaceable PIN pads in the dispensers is feasible, but not cost effective for service stations which have a large number of dispensers and requires a large inventory of replacement devices.

Also, it would be desirable to have the encryption keys used in the host system as secure as possible, since unauthorized access to those keys could lead to large losses. If each dispenser has the host system encryption key in it, the chances for loss increase. Accordingly, it would be desirable to avoid injecting the host keys into the dispensers or any part of the dispenser, to enhance security.

Various other cryptographic efforts are known for various applications, of which the following patents and publications are exemplary, but none disclose or suggest the invention disclosed or claimed herein:

| | | |
|---|---|---|
| 4,658,094 | 4/1987 | Clark |
| 4,405,829 | 9/1983 | Rivest et al |
| 4,424,414 | 1/1984 | Hellman et al |

"A Method for Obtaining Digital Signatures and Public-Key Cryptosystems." By R. L. Rivest, A. Shamir, and L. Adelman, *Communication of the ACM*, February 1978, Volume 21 Number 2. Pages 120–126.

*The Art of Computer Programming*, Volume 2: *Seminumerical Algorithms*, By D. E. Knuth, Addison-Wesley, Reading, Mass. 1969.

"The First Ten Years of Public Key Cryptography", By Whitfield Diffie, *Proceedings of the IEEE*, Volume 6 Number 5, May 1988, Pages 560–577.

Thus, there still remains a need in the art for a suitable system and components for secure handling of PINs in service stations and other retail environments.

SUMMARY OF THE INVENTION

The present invention provides a device and a system to originate cryptographic keys for use within the service station in the gasoline dispensers in a secure manner without the need for cryptographic key injection in each dispenser. The same technique can be used for encryption of analogous self-service dispensers in other retail environments. Furthermore, it makes possible the separation of the encryption process and cryptographic keys for the host computer system from those of the local system used in the service station to help maintain high security through the entire system.

One aspect of the invention includes the use of a security module which interacts with a local controller, the dispensers, the PIN pads and the host computer. It cooperates with the dispensers and PIN pads to supply them with encryption keys and communicates with them in encrypted form. The security module also encrypts data to be sent to the host computer using the host computer's encryption method and keys. It may also, if desired, decrypt data from the host computer for local use.

Since the local cryptographic system is separated from the host cryptographic system, only the host portion of the security module need be changed to accommodate the host cryptographic keys and methods in order to work with different host computers. This provides economies of manufacture and inventory since the same system need be modified only slightly to accommodate different host computer interfaces. This system also allows for operation with PIN pads or other devices which have been injected in a secure environment, with either the host or the local cryptographic system. Both the encryption methods employed in the security module for operation with the host and the methods used in the local system can be determined by the key injection process, whereby the security module configures itself for a specific host and/or local system, depending on the method or data used during the key injection process. In this manner the hardware and software for various host and local systems operation can be accomplished without the need for separate manufacturing processes for the security module—only the key injection process need be changed.

In one aspect, the invention provides a secure data handling system for assembly into a network for securely communicating data from data handling devices at a retail site to a host computer over unsecured data lines. It includes a plurality of data entry modules, a security module and a site controller, the data entry modules and the security module including means for encryption of data and means for communicating encrypted data to the site controller, the site controller having means for directing encrypted data received from the data entry modules to the security module and from the security module to the data entry modules or the host computer as needed for properly directing encrypted data to a desired destination. The security module includes means for encryption and decryption of data associated with each data entry module unique to the data entry module. (If desired for simplicity, the encryption of data in the PIN pads and the associated decryption may be the same for several or all of the PIN pads.) Preferably, the security module includes means for encryption and decryption of data associated with the data entry modules which is different from its encryption and decryption of data associated with the host computer.

The means for encrypting encrypts the data in a manner which is infeasible to decrypt without possession of a decryption key. Such encryption is preferably selected from the group consisting of the Rivest-Shamir-Adelman algorithm (RSA), the Diffie-Hellman algorithm (DH), the Data Encryption Standard (DES) and one or more of RSA, DH and DES. In one embodiment, the means for encryption encrypts using the Data Encryption Standard using a unique key per transaction (UKPT). Alternatively, the means for encryption encrypts with the Data Encryption Standard using a Master key/Session key.

The site controller is generally not secure from unauthorized signal detection. In one embodiment, at least one of the data entry modules includes a keypad for receiving personal identification numbers.

Preferably, the security module includes means for receiving a cryptographic key usable with the host for the encryption and decryption of data or for the encryption and decryption of working keys used for the encryption and decryption of data. The means for encryption may encrypt with a process selected from the group consisting of the Rivest-Shamir-Adelman algorithm (RSA), the Diffie-Hellman algorithm (DH), the Data Encryption Standard (DES) and one or more of RSA, DH and DES. For example, the means for encryption may encrypt with the Data Encryption Standard using a unique key per transaction or with the Data Encryption Standard using a Master key/Session key (MKSK).

In one embodiment the security module and the data entry modules include means for receiving pre-injected cryptographic keys such that the security module has keys unique to Several of the data entry modules and usable with the respective data entry module for the encryption and decryption of data or further working keys used for the encryption and decryption of data. As before, the encryption may be selected from the group consisting of the Rivest-Shamir-Adelman algorithm (RSA), the Diffie-Hellman algorithm (DH), the Data Encryption Standard (DES) and one or more of RSA, DH and DES. Of course, other suitable encryption algorithms may also be used.

Desirably, the means for encryption in the security module and the data entry modules may cooperatively change their respective keys. Such a change of keys may be in response to the passage of time or in response to the occurrence of an event.

Preferably, the security module and only the security module includes means for receiving a cryptographic key associated with the host computer and the means for encryption in the security module encrypts with keys associated with the data entry modules, which keys are unrelated to the cryptographic key associated with the host. Alternatively, the security module and certain of the data entry modules include means for receiving pre-injected cryptographic keys such that the security module has keys unique to several of the data entry modules (such as the PIN pads) and usable with the respective data entry module for the encryption and decryption of data or further working keys used for the encryption and decryption of data, and the security module and others of the data entry modules (such as the dispensers) include means for the generation of cryptographic keys unique to each data entry module using exponential key exchange (such as disclosed in U.S. Pat. No. 4,200,770, the disclosure of which is incorporated herein by reference, or another suitable algorithm). The keys may be usable between the security module and the respective ones of the other data entry modules for the encryption and decryption of data or further working keys used for the encryption and decryption of data.

In a particularly advantageous embodiment at least some of the data entry modules are dispensers. Typically, at least one of the data entry modules is a PIN pad.

Preferably, the security module includes an enclosure fortified against intrusion by an eavesdropper.

In another aspect, the invention provides a process for protecting the security of a PIN entered into a dispenser including the steps of encrypting the PIN in the dispenser with a working key, transmitting the encrypted PIN to a security module, decrypting the PIN in the security module with the working key, re-encrypting the PIN with a host key and transmitting the re-encrypted PIN to a host. Preferably, the process further includes the preliminary step of equipping the security module so as to erase all cryptographic keys upon a physical intrusion into the security module.

In a further aspect, the invention provides a gasoline service station including dispensers and PIN pads which include keypads for receiving personal identification numbers. The dispensers and PIN pads are assembled into a network for securely communicating personal identification numbers from the PIN pads and dispensers to a host computer over unsecured data lines. The PIN pads and dispensers each include means for encryption and decryption of data and outputting encrypted data. The service station also has a security module including means for encryption and decryption of data associated with each PIN pad and dispenser at least some of which are unique to the respective PIN pads and dispensers and means for encryption and decryption of data associated with the host computer, which is different from its encryption and decryption of data associated with the PIN pads and dispensers. Desirably, the dispensers have unique encryption means, but the PIN pads may have encryption means which operate in common. The security module also has means for outputting encrypted data. The service station also includes a site controller, which is not secure from unauthorized signal detection, and has means for directing encrypted data received from the PIN pads and the dispensers to the security module and from the security module to the dispensers or the host computer as needed for properly directing encrypted data to a desired destination.

The means for encrypting in the PIN pads, dispensers and the security module encrypt data in a manner which is infeasible to decrypt without possession of a decryption key. The security module and only the security module includes means for receiving a cryptographic key associated with the host computer usable with the host for the encryption and decryption of data or further working keys used for the encryption and decryption of data. The means for encryption in the security module encrypts with keys associated with the PIN pads and dispensers, which keys are unrelated to the cryptographic key associated with the host. The security module and the PIN pads and dispensers may cooperatively change their respective keys in response to the passage of time or in response to the occurrence of an event. At least one of the means for encryption encrypts with a process selected from the group consisting of the Rivest-Shamir-Adelman algorithm (RSA), the Diffie-Hellman algorithm (DH), the Data Encryption Standard using a unique key per transaction (DES/UKPT), the Data Encryption Standard using a Master key/Session key (DES/MKSK), and more than one of RSA, DH and DES/UKPT and DES/MKSK.

Preferably, the security module and the PIN pads and dispensers include means for receiving pre-injected cryptographic keys or values usable to compute cryptographic keys, such that the security module has keys unique to several of the PIN pads and dispensers and usable with the respective PIN pads and dispensers for the encryption and decryption of data or further working keys used for the encryption and decryption of data. Preferably, the security module and the dispensers include means for the generation of cryptographic keys unique to each PIN pad and dispenser using exponential key exchange, the keys being usable between the security module and the respective ones of the dispensers for the encryption and decryption of data or further working keys used for the encryption and decryption of data.

In a further aspect, the invention provides a security module for storing sensitive data in electronic form in a memory. It includes an enclosure for an electronic circuit which has the memory and data input leads to supply the sensitive data to the memory and to allow selective outputting of data from memory. A barrier within the enclosure encloses the memory and is electrically joined with the memory such that a penetration of the barrier electrically induces the memory to lose the data stored therein. Typically, the electronic circuit includes encryption circuitry to encrypt data outputted from the memory.

Preferably, the memory is a CMOS random access memory, and the circuit includes a battery to supply power to the CMOS random access memory. In a preferred embodiment, the circuit includes a long, narrow conductor extending continuously over substantially all of the barrier and in a circuit so that a break in the conductor will induce the memory to lose the data stored in the memory and so that a penetration of the barrier will be likely to break the conductor. Preferably, the barrier is scored to induce the breaking of the conductor upon a manipulation of the barrier. In a particularly preferred embodiment the enclosure has an interior and the barrier substantially entirely surrounds the memory and adheres to the interior of the enclosure.

Preferably, the conductor on the barrier is in a circuit with a continuity detector which causes a voltage reversal on the CMOS random access memory to cause the memory to lose the data stored therein when a discontinuity in the conductor is detected. In a particularly preferred form, the circuit includes a connector which protrudes from the enclosure and a thin conductor which extends behind the connector is in a circuit so that a break in the conductor will induce the memory to lose the stored data.

In a preferred embodiment the enclosure includes a closure and the circuit includes a switch actuated by the closure and in a circuit such that upon deactuation of the switch by movement of the closure to deactuate the switch, the memory is induced to lose data stored therein.

Preferably, the enclosure is made of stainless steel. This can be particularly advantageous, because an attempt to drill through the steel will cause the formation of shards which assist in penetrating the enclosed barrier and activating the memory erasing circuit.

Desirably, the security module includes a battery in the circuit and a switch actuable from outside the enclosure to supply power from the battery to the circuit. More preferably, the security module includes a battery voltage detector to detect a low voltage in the battery and a circuit to induce the memory to lose the data stored therein when a low voltage is sensed. This protects against detection circuitry failure, which can occur at extremely low battery voltage.

The invention may also be characterized as providing a security module for storing sensitive data in electronic form in a memory including an enclosure for an electronic circuit including the memory and data input leads to supply the sensitive data to the memory and to allow selective outputting of data from memory, a closure for the enclosure and a switch in the circuit actuated by movement of the closure and electrically joined with the memory such that a movement of the closure electrically induces the memory to lose the data stored therein.

The invention also includes a method of operating a gasoline service station including the steps of inserting a card belonging to a cardholder into a card reader to derive data, entering a PIN into a keypad in an enclosure, encrypting the PIN in the enclosure using a first encryption key, transmitting the encrypted PIN to a security module, de-encrypting the PIN in the security module and re-encrypting the PIN using a second encryption key, transmitting the re-encrypted PIN and data read from the card to a remote host computer, and transmitting authorization of a gasoline sale to the holder of the card from the remote host computer to a dispenser at the service station.

BRIEF DESCRIPTION OF THE DRAWINGS

The invention will be better understood after a reading of the Detailed Description of the Preferred Embodiments along with a review of the drawings in which:

FIGS. 8, 9, 10, and 11 are schematic diagrams of various circuits in the security module.

DETAILED DESCRIPTION OF THE PREFERRED EMBODIMENT

Figure 1:
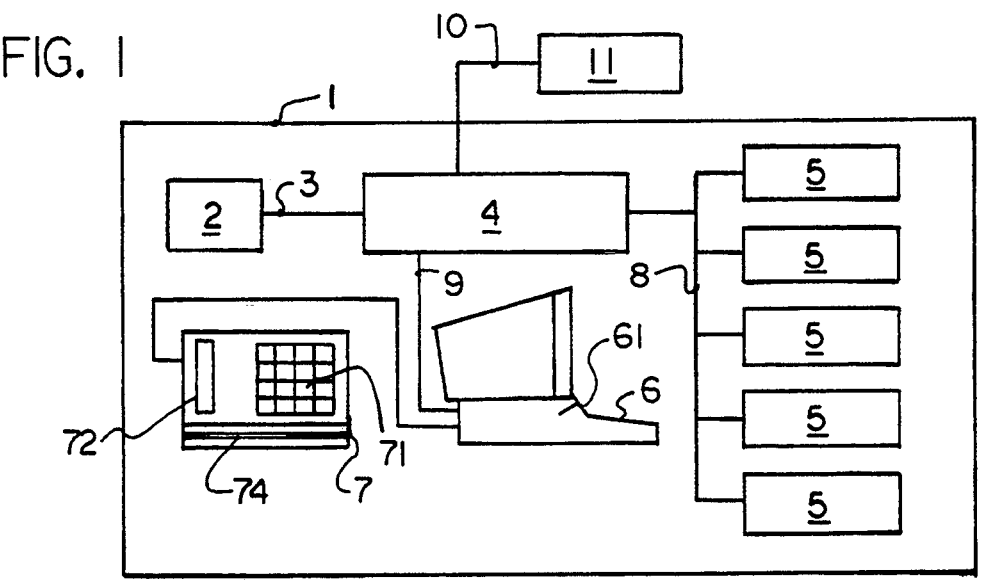
FIG. 1 is a functional diagram of the main components of the system.

FIG. 1 is a diagram of the electronic sale system for a gasoline station. As will be appreciated by those of ordinary skill in the art, similar configurations may be used in other retail environments. In the station a site controller 4, which is a computer, controls all aspects of retail sales in the station and links all operating modules together into one functional system. Suitable site controllers are commercially available from Gilbarco, Inc., Greensboro, N.C. as Model numbers C-15 PA0190xxxxxxx and C-2 PA0211xxxxxxx, where the x's stand for various product configuration options, such as a type or size of a disk drive or the like. The data communication links 3, 8, 9, 10, and 73, are unsecured links, that is, subject to interception of data. Communication link 10 is a link, typically a telephone line (either leased line or dial), to a host computer system 11 from the station. The host computer system 11 logs sales information received from the site and also approves credit and debit card sales and is located far from the station. Typically, the host computer is associated with a bank, or other credit or debit card handling institution, such as a petroleum company, which issues such cards to the public.

A point of sale cash register or console 6 is linked to the site controller 4 by communication link 9 and has a built-in or associated card reader 61. The console 6 also has keyboards, displays, and/or printers to allow a human operator to control the station.

Linked to console 6 by communication link 73 is a PIN entry pad 7 which has at minimum a keyboard 71 for pin entry. The PIN pad 7 may also have a display 72 for customer prompting, and/or a built in card reader 74. Gasoline dispensers 5 also have built-in card readers, displays, keyboards, and printers.

Item 2 is the security module. The security module 2, the dispensers 5, and the PIN pads 7 are considered secure devices, that is they cannot be penetrated to obtain usable cryptographic information. The site controller 4 and the console 6 are not considered secure devices. In a given station there may be a multiplicity of consoles 4, PIN pads 7, and dispensers 5, all controlled by one site controller 4 and cryptographically served by only one security module 2.

Figure 2:
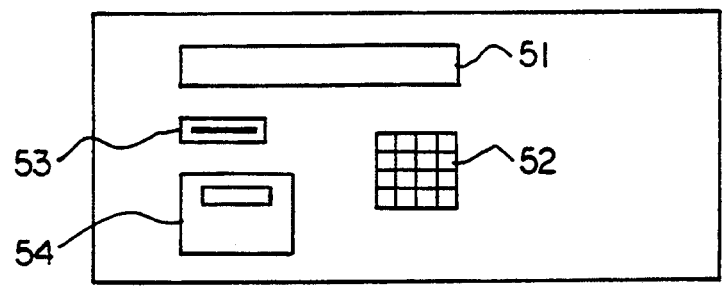
FIG. 2 is an illustration of a typical user's interface on a gasoline dispenser in the system.

FIG. 2 is a detail of a portion of the dispenser 5 showing the display 51, a keyboard 52, a card reader 53, and a receipt printer 54. Other displays and controls on the dispenser 5 that relate to the dispensing information and controls are not shown. All controls, displays, and devices shown in FIG. 2 are meant for activation and use directly by the customer and do not in the general case require attendant intervention.

SECURITY MODULE

Figure 3:
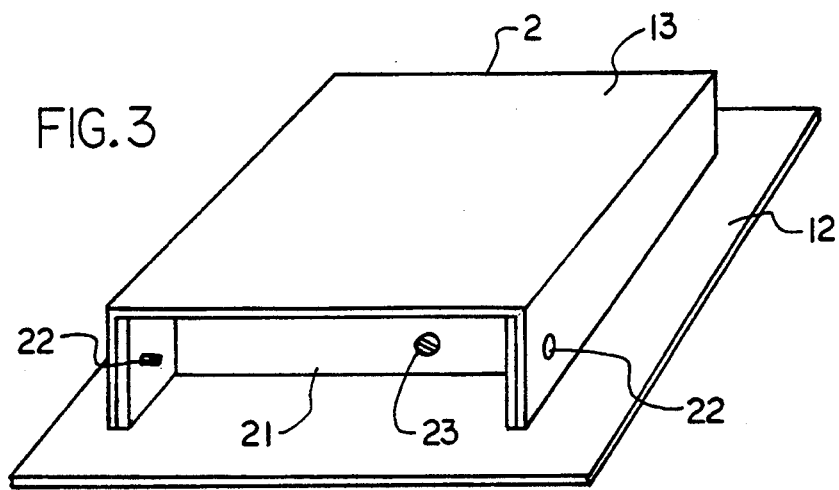
FIG. 3 is a perspective view of one end of a security module as used in the system.
Figure 4:
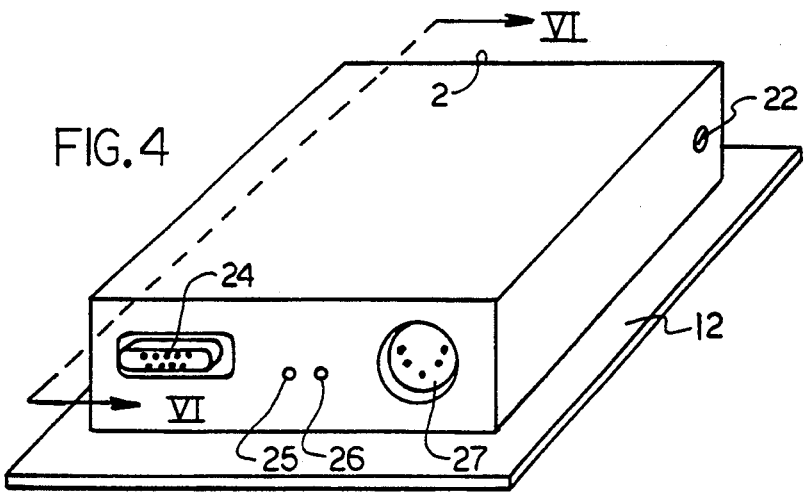
FIG. 4 is a perspective view of an opposite end of the security module depicted in FIG. 3.

FIGS. 3 and 4 show the outside views of the enclosure for the security module 2. It includes a flat mounting plate 12, with a top structure 13 welded thereto, creating a five-sided enclosure which has no seams large enough to permit penetration. The plate 12 and top structure 13 are made of stainless steel approximately 0.1 inches thick. Other suitable materials may be substituted. Also shown in FIG. 3 is an access cover 21 held in place by two screws 22. A screw 23 is inserted after assembly and before the security module 2 is injected with keys, because screw 23 connects the battery to the rest of the circuit by actuating a mechanical switch (33 in FIG. 7).

As can be seen in FIG. 4, the opposite end of the enclosure 2 has a cable connector 24 for transmitting and receiving data to and from the site controller, a cable connector 27 to attach an external power supply, a light emitting diode 25 to indicate the presence of power, and a light emitting diode 26 to facilitate the diagnosis of problems in the security module.

The security module protects cryptographic keys which are stored in CMOS battery powered random access memory (RAM) chips located on a printed circuit board inside the security module enclosure. Preferably the RAMs are of the CMOS variety so that the loss of power to the RAM quickly voids the sensitive data stored in the RAM memory. Various techniques are used to prevent successful extraction of the keys from the security module.

As noted, the security module is encased in a welded stainless steel enclosure. The hardness of the steel enclosure makes physical penetration of the unit difficult and increases the likelihood of tripping the internal detection circuitry. Although the security module is not seam welded, the construction of the enclosure is such that the small size of any gaps prevents penetration. The one opening for inserting the printed circuit board 30 is at one of the small ends of the enclosure. This opening is recessed and the cover 21 prevents penetration of the security module through the opening.

Figure 5:
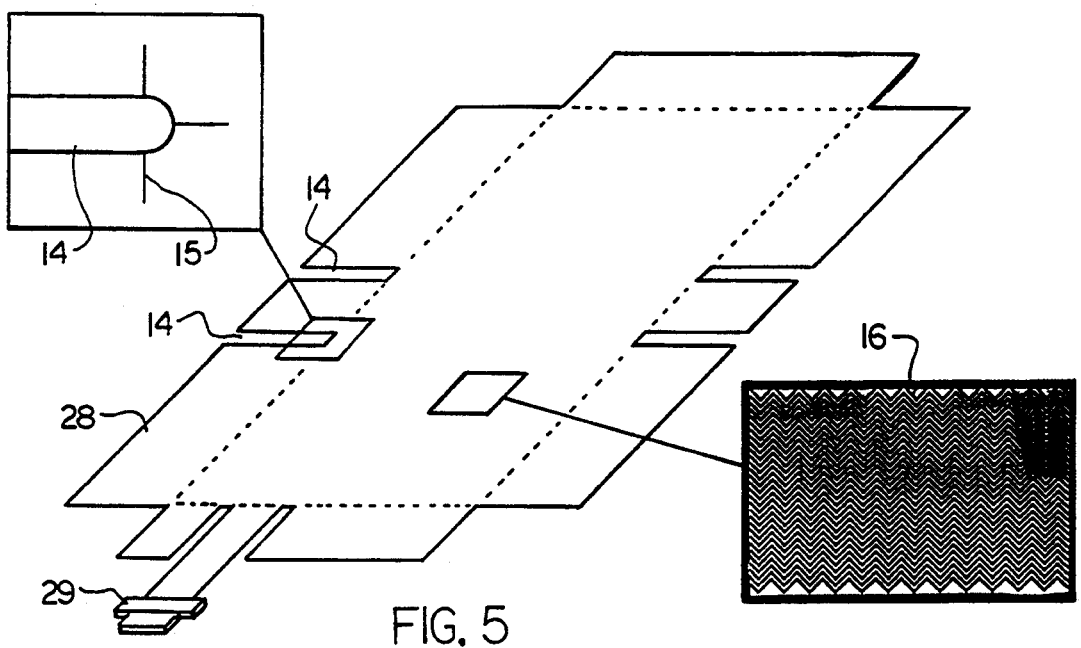
FIG. 5 is a perspective view of an unfolded sheet which when folded forms a sheath surrounding various circuit components of the security module within the enclosure thereof.
Figure 6:
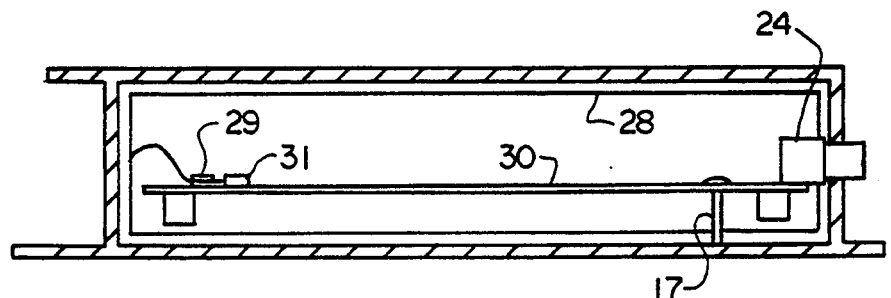
FIG. 6 is a sectional view of the security module taken along lines VI—VI in FIG. 4 and looking in the direction of the arrows.

As depicted in FIGS. 5 and 6, immediately inside the security module is a substantially completely encasing cover 28. The only gaps in the cover 28 are sized to fit protruding LEDs 25 and 26, connectors 24 and 27 and switches 32 and 33. Cover 28 is screened with a single continuous conductor 16 leaving no open gaps or straight unscreened lengths longer than 0.15 inches (see detail #2 in FIG. 5). The cover 28 is folded around printed circuit board 30 within the enclosure 2 and overlapped with itself to leave no unclosed gaps in a sheath surrounding the PC board. The cover 28 joined to the inside of the stainless steel enclosure 12,13 with a full coverage application of adhesive on all six surfaces of the cubic form of the enclosure. Cover 28 is formed with gussets 14 at all corners and scores 15 in various directions. These scores encourage the start of tearing of cover 28 to break conductor 16 should a penetration of the security module be attempted. The single conductor is wired to the printed circuit board by connector 31 shown in FIG. 6 with plug 29. PC board 30 includes a suitable continuity detector circuit shown in FIG. 8. In the event repair is needed to a security module unit, the cover 28 may, if desired, simply be destroyed and replaced.

Figure 7:
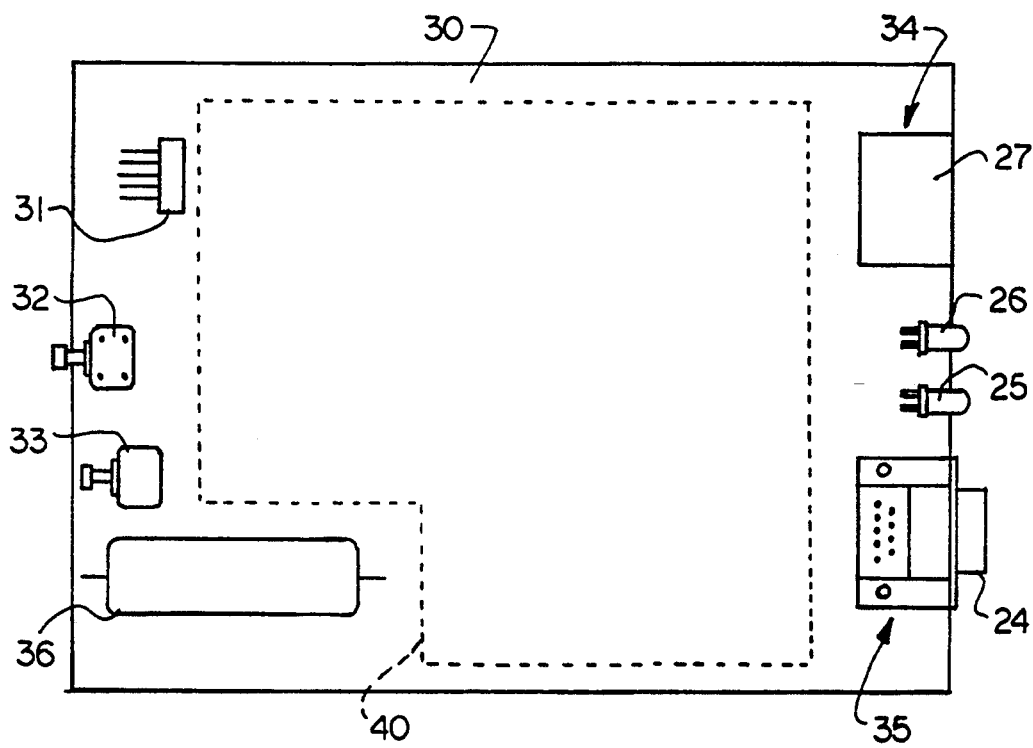
FIG. 7 is a top view of a printed circuit board used in the security module illustrating the arrangement of components thereon.

Referring to the illustration of the PC Board 30 in FIG. 7, the RAMs and associated data handling and manipulation circuits are depicted in general form by the block 40. It is on these chips that the encryption and decryption procedures described herein are performed. A preferred encryption procedure is the well-known Data Encryption Standard, known as DES, and supported by the National Bureau of Standards, as defined in Federal Information Processing Standards Publication FIPS PUB 46. Numerous arrangements of RAMs, EPROMs and microprocessors and their appropriate programming to function as called for herein will be readily apparent to those of ordinary skill in the art, so no enunciation of specific chips or their configuration are deemed to be needed to provide those of ordinary skill in the art an enabling disclosure of the invention.

A switch 32 is located to protrude through the cover 28 and normally be actuated when the access cover 21 is in place. Should the switch 32 be de-activated by removing the cover 21, the switch forces a short circuit around the power and ground pins of the internal RAMs. This causes a loss of power in the RAM so the data stored therein (i.e. the encryption keys sought to be protected) is lost.

The external power supply to the board 30 comes through connector 27, and data transfers into and out of the PC board come through data connector 24. The openings in the enclosure of the security module for the power and data connectors are protected by a 30 gauge insulated wire 34 & 35 FIGS. 7 & 8 wired behind each connector and in series with the conductor 16. Any attempt to drill or push in these connectors will break the 30 gauge wire and trip the internal protection circuitry.

Light emitting diodes 25 and 26 are also mounted on the board 30, and their functioning is discussed above. The openings in the enclosure for the LEDs 25 & 26 are quite small in size and require no further protection.

A second switch 33 mounted on the PC board 30 is activated by inserting a screw 23 into the access cover 21 from the outside of the enclosure. This switch serves two purposes. First, because the screw must be inserted to connect the battery to the circuit, no power will be used from the battery when it is in manufacturing storage. Prior to injecting encryption keys into the security module, this screw must be inserted to allow data retention by the RAMs when the external power supply to the security module is off, which occurs when the power supply connector 27 is unconnected to a power supply or the power supply to the connector fails. Second, when the screw is not in place, switch 33 forms a short circuit around the power and ground pins of the RAM. If penetration is attempted by leaving the power connected and turned on, and then removing the screw 23, the RAM would be cleared and the security module would be rendered inoperable. The screw can be removed with the power supply turned off, but that also causes a short around the RAMs to destroy the data.

Figure 8:
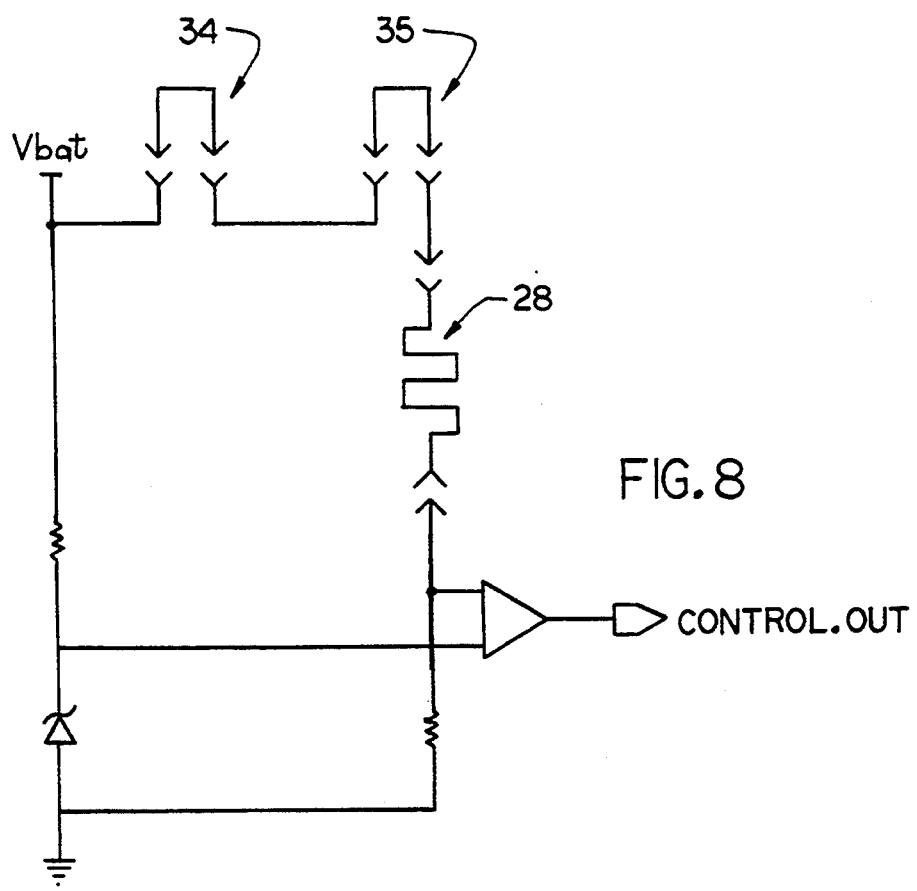
Figure 11:
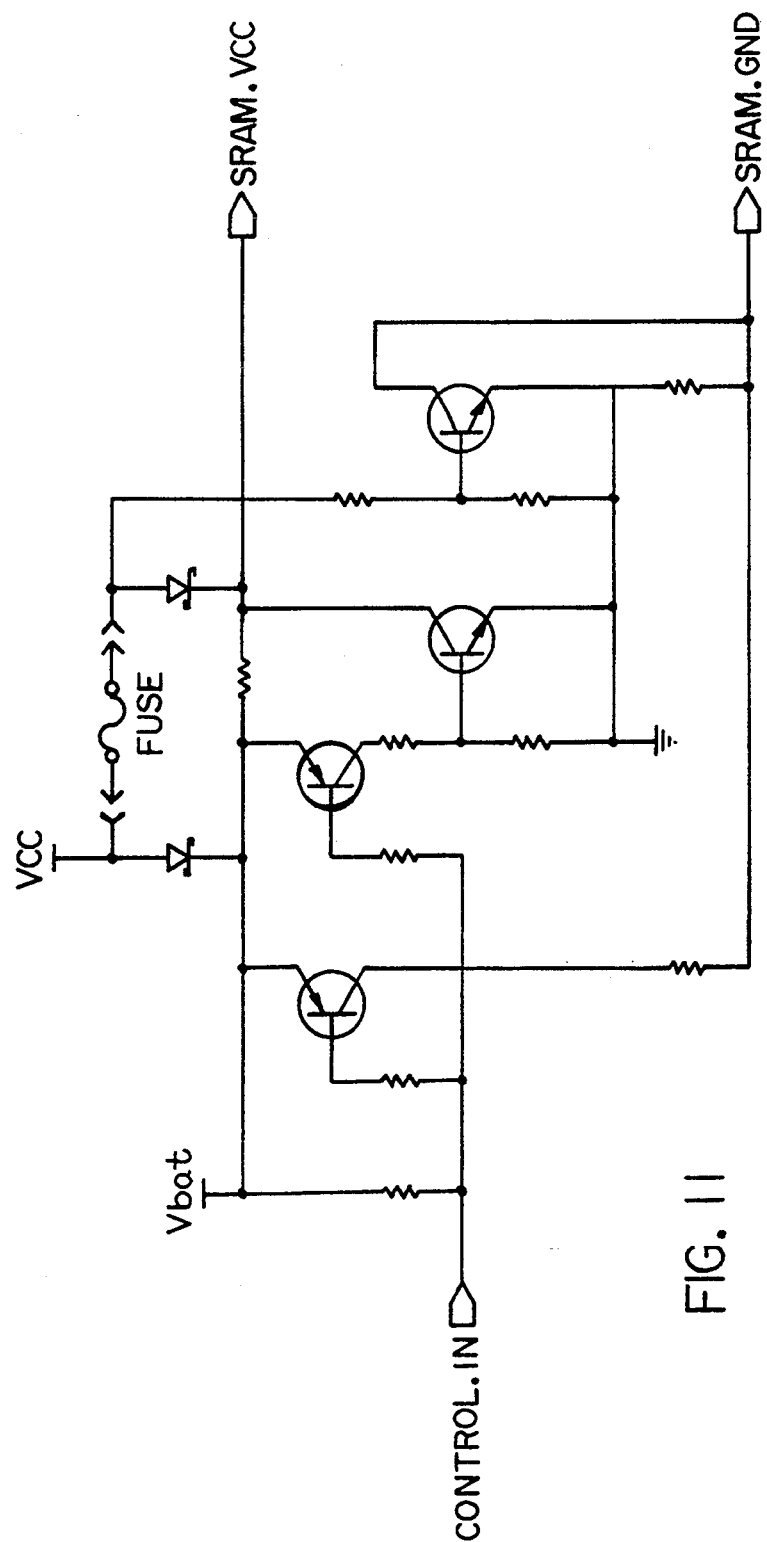
Figure 12:
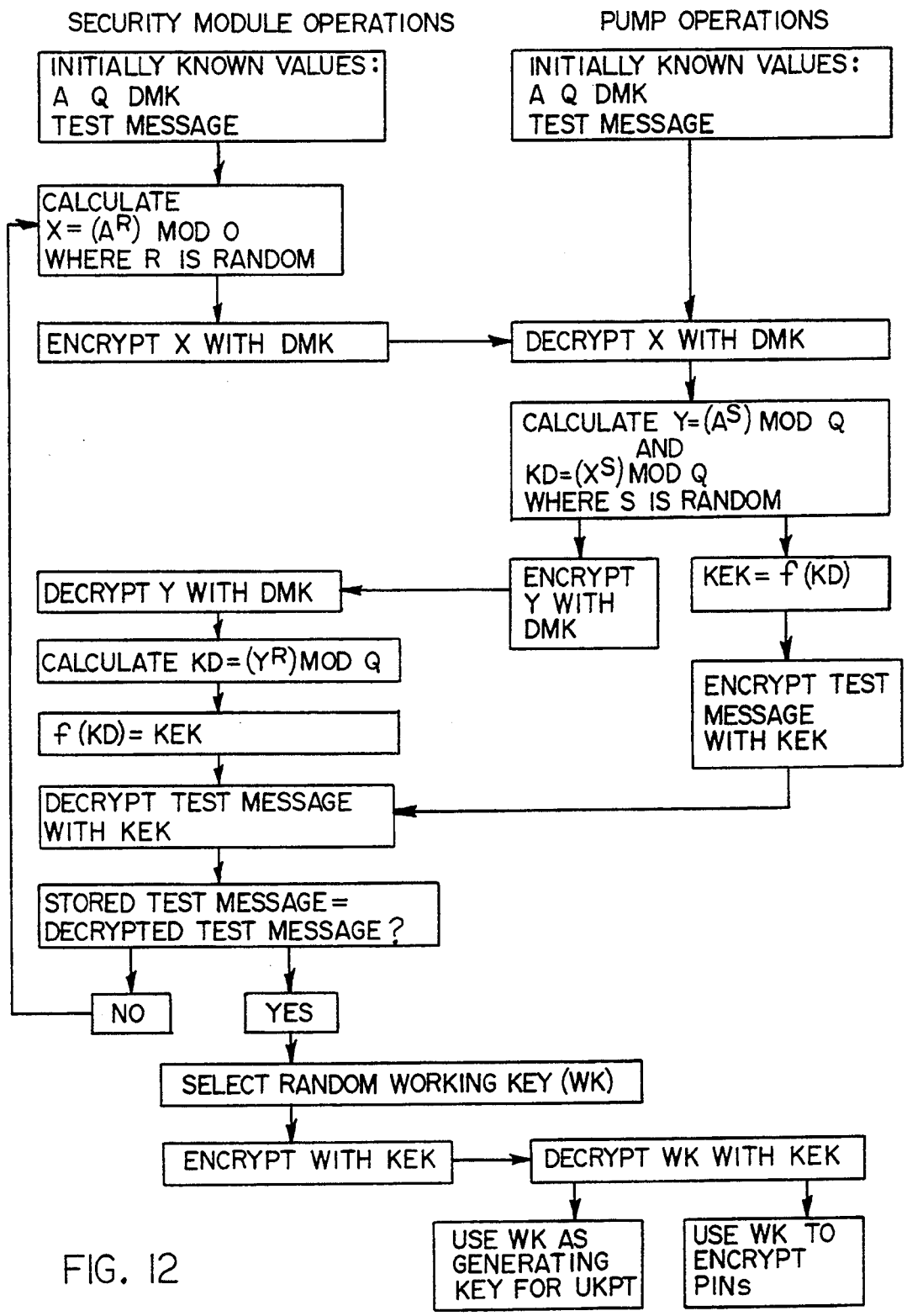
FIG. 12 is a flow chart for key exchange between the security module and the remote units, i.e. gasoline dispensers.

There are two detection circuits in the security module which can cause the RAMs to lose their data. The first is depicted in FIG. 8 and detects the continuity of the conductor 16 in the cover 28 and the two trip wires 34 & 35 on the PC board 30. If any one of the conductor 16 or trip wires 34, 35 is broken, the circuitry of FIG. 11 causes a voltage reversal on the RAMs, thereby causing them to lose data. The fuse in FIG. 11 is necessary to drop out the voltage from the power supply in event it is on when a voltage reversal is activated.

A lithium battery maintains a nearly constant voltage throughout its discharge lifetime with a steep rollover at the end of life. At very low battery voltages the protection circuitry ceases to work. So, the second detector, shown in FIG. 9, senses the state of the lithium battery 36 used to maintain the CMOS ram data. When the battery voltage is low, the output of this circuit forces a voltage reversal on the power pins of the RAMs.

The security module cannot be penetrated by removing the cover screws and pushing all the internal parts out the cover end while holding the cover tightly to the switches. This is because the PC board 30 is fastened to the inside of the steel enclosure at the connector end by a bracket 18 affixed to the board 30 and a screw 17 at assembly time, and the cover 28 surrounding the printed circuit board 30 is glued to all surfaces of the inside of the enclosure including the closure 21.

ENCRYPTION TECHNIQUES

Various encryption techniques and key generation and exchange techniques may be used with the invention, as long as they are compatible with the procedures called for herein. One suitable procedure known to the art is called Unique Key Per Transaction, and known by the acronym UKPT. UKPT is a method of generating new keys for use in the DES algorithm from an initial key called a generating or derivation key. This method uses a unique key for every encryption operation and is identified for the decryptor by a serial number combined with an encryption cycle counter, enabling the decryptor to calculate the current key.

Another suitable technique is known as RSA for the three persons associated with its development: Rivest, Shamir, and Adelman. RSA is a method of public key cryptography, explained in more detail in U.S. Pat. No. 4,405,829.

Another suitable technique is the Diffie-Hellman procedure as described in U.S. Pat. No. 4,200,770, which together with the technique shown in U.S. Pat. No. 4,797,920 and similar techniques is known as exponential key exchange.

KEY INJECTION OF THE SECURITY MODULE

Initially, via data connector 24 at a secure facility, the security module is injected with the cryptographic keys necessary to encrypt PINs for the host computer system. Just before this occurs, screw 23 is installed to allow the battery to activate the protection circuits and provide battery power for the RAMs. After the host cryptographic keys are injected, more cryptographic keys may be injected into the security module for use with pre-injected local remote devices such as the PIN pads 7 shown in FIG. 1. The battery maintains the data during shipment from the injection site to the service station and thereafter whenever the power is off.

KEY GENERATION BETWEEN THE GASOLINE DISPENSERS AND THE SECURITY MODULE

The site controller 4 is in overall charge of the operation of the site, including the sequence of events between the security module and the dispensers. The site controller which is in communication with the dispensers determines that one or more of the dispensers requires a cryptographic key. To initiate the process, the site controller requests key generation for a specific dispenser from the security module. Reference to FIG.

12 may assist the reader in following the subsequent discussion of key selection and generation, known as exponential key exchange. The security module and the dispenser or other remote unit are both initially loaded with several values in common, namely the values A, Q, a test message and a default master key. The values A and Q are large prime numbers. None of these values need to be stored on a secure basis, since even knowledge of all four will not assist an interloper in determining the actual encryption keys which will be used to encrypt the PIN numbers.

The security module selects a large random number R and calculates the value $$X = \text{Mod } Q (A^R),$$

where the Mod function returns the integer remainder after long division. That is x = the remainder when A to the R power is divided by Q. The value of X is then encrypted by the security module using the default master key. The encrypted value X is then sent to the site controller and the site controller sends it to the correct dispenser. The dispenser decrypts X with the default master key. Then, the dispenser selects a random number S and calculates $$Y = (A^S) \text{ Mod } Q$$

and $$KD = (X^S) \text{ Mod } Q$$

and

The dispenser then calculates a Key Exchange Key (KEK) from the value KD. This calculation may involve any desired suitable function f() so as to produce KEK as a 64 bit DES key. Several methods can be used in f(), including truncation and exclusive 'or'ing parts of KD together.

The dispenser then encrypts Y with the default key and encrypts the test message using the DES algorithm with KEK used as the encryption key. Both the encrypted Y and the encrypted test message are returned to the site controller which in turn sends this data to the security module.

The security module decrypts Y with the default key and then calculates $$KD = (Y^R) \text{ Mod } Q.$$

The security module then calculates the KEK from the value KD, using the same function f() previously used by the dispenser. Using the value KEK, the security module then decrypts the test message which was encrypted by the dispenser with the KEK.

If the test message does not match the stored value, the security module selects a new random number R and calculates a new $$X = (A^R) \text{ Mod } Q$$

to start the process over again. If the decrypted test message matches the test message stored within the security module, then the security module continues with the setup process, because the dispenser and the security module have calculated the same KEK. The KEK values in the dispenser and the security module are equal, not only as confirmed by identity in the test messages, but also because the values of KEK calculated are mathematically equivalent:

$$((A^R)\text{Mod } Q)^S \text{Mod } Q = (A^{R*S})\text{Mod } Q = (A^{S*R})\text{Mod } Q = ((A^S)\text{Mod } Q)^R \text{Mod } Q.$$

The security module then selects a randomly or pseudo randomly generated working key, WK, encrypts it with the KEK and sends it to the site controller which then sends it to the correct dispenser. The dispenser decrypts the working key with the KEK. Depending on the desired mode of operation, the dispenser may use WK as an encrypting key in any of various encryption methods (i.e. DES, UKPT, RSA, etc.) whenever a PIN number is to be encrypted.

In a preferred embodiment of the system, the dispensers use WK as a generating key for UKPT. As long as the dispenser and security module retain the KEK, it is not changed, but the working keys between the security module and the dispensers are preferably changed regularly in response to specific system events or on a timed basis. The KEK's may change for various reasons: cold starting a dispenser (clearing all of its memory data storage); replacing a dispenser or a security module; or replacing a site controller hardware or software.

The generation of the KEK's may also be accomplished by algorithms other than exponential key exchange.

TYPICAL OPERATION BETWEEN THE SECURITY MODULE AND THE GASOLINE DISPENSER

In a typical operation with the dispenser, the customer inserts his or her debit card into card reader 53, the dispenser reads the card, and either the dispenser, the site controller, or the host computer determines that a PIN number entry is necessary. The customer is requested to enter his PIN number at the dispenser by the prompting display 51. The dispenser assembles the PIN number along with the debit card number to form a standard PIN number block as defined in ANSI standard X9.24 or to some other standard and encrypts that PIN number block with the working key or the derived working key in the method chosen for cryptographic operation. The encrypted PIN number block is then transmitted to the site controller 4, and the site controller 4 sends it to the security module 2. Within the security module 2 the encrypted PIN number block is decrypted using the stored working key or its derivation associated with the dispenser in use, to recover the clear text PIN number block. The PIN number block is then re-encrypted using the host encryption key(s) in the method used by the host computer 11, and then transmitted to the site controller 4. The site controller 4 then transmits the encrypted PIN number block to the host computer 11 for further processing and identity checks. In this way the clear text PIN number block is never present on an unsecured transmission line or in an unsecured module.

TYPICAL OPERATION WITH AN INJECTED PIN PAD

In operation with a PIN pad 7 which has been previously injected with a key, the operation can be performed in one of two different ways.

In the first case the PIN pad 7 has been injected with a local master key and the security module has been injected with the same local master key. When a PIN number is entered into the PIN pad 7, the PIN pad 7 encrypts the PIN number or PIN number block with the local master key or with a down-loaded working key which was transmitted to the PIN pad 7 in an encrypted form using the local master key as the encryption key. The PIN pad 7 then sends the encrypted PIN number block to the console 6 which in turn sends it to the site controller 4 which then sends it to the security module 2. The security module 2 then decrypts the PIN number block and re-encrypts it using the host encryption key. The encrypted PIN block is then sent to the site controller 4 which then transmits it to the host computer 11 for final processing.

In the second case the PIN pad 7 has been injected with encryption keys defined by the host 11 in much the same way the security module was injected. Then when the PIN pad 7 sends the encrypted PIN number block to the site controller 4 through the console 6, it is sent directly to the host 11 without further processing by the security module 2.

In both cases the clear text PIN number or PIN number block never exists on an unsecured transmission channel or in an unsecured module of the system.

If desired, the key exchange process outlined above for interaction between the dispensers and the security module may be used with the PIN pad, substituting a suitably configured PIN pad for the dispenser in the above description.

The encryption process may also employ DES-/UKPT, RSA, DES/MKSK, DH or other methods for either of the cases above.

We claim:

1. A security module for storing sensitive data in electronic form in a memory comprising
   an enclosure for an electronic circuit including said memory and data input leads to supply the sensitive data to the memory and to allow selective outputting of data from memory,
   a barrier within said enclosure and enclosing said memory and electrically connected with said memory such that a penetration of said barrier electrically induces said memory to lose the data stored therein, said barrier being scored to induce the breaking of said electrical connection upon a manipulation of said barrier.

2. A security module as claimed in claim 1 wherein said electronic circuit includes encryption circuitry to encrypt data outputted from said memory.

3. A security module as claimed in claim 2 wherein said memory is a CMOS random access memory and said circuit includes a battery to supply power to said CMOS random access memory.

4. A security module as claimed in claim 3 wherein said circuit includes a conductor extending continuously in a tortuous path over substantially all of said barrier and in a circuit so that a break in said conductor will induce said memory to lose the data stored in said memory and so that a penetration of said barrier will be likely to break said conductor.

5. A security module as claimed in claim 4 wherein said conductor is in a circuit with a continuity detector which causes a voltage reversal on said CMOS random access memory to cause said memory to lose the data stored therein when a discontinuity in said conductor is detected.

6. A security module as claimed in claim 1 wherein said enclosure includes a access cover and said circuit includes a switch actuated by said access cover and in a circuit such that upon deactuation of said switch by movement of said access cover to deactuate said switch, said memory is induced to lose data stored therein.

7. A security module as claimed in claim 6 wherein said enclosure is made of stainless steel.

8. A security module as claimed in claim 1 wherein said enclosure has an interior and said barrier substantially entirely surrounds said memory and adheres to said interior of said enclosure.

9. A security module for storing sensitive data in electronic form and a memory comprising
   an enclosure for an electronic circuit including said memory and data input leads to supply the sensitive data to Said memory and to allow selective outputting of data from said memory,
   a barrier within said enclosure and enclosing said memory and electrically connected with said memory such that a penetration of said barrier electrically induces said memory to lose the data stored therein, said barrier being scored to induce the breaking of said electrical connection upon a manipulation of said barrier, and
   a battery in said circuit and a switch actuable from outside said enclosure to supply power from said battery to said circuit.

10. A security module as claimed in claim 9 wherein said enclosure includes an interior and a access cover and a member is movable in said access cover toward the interior of said enclosure to actuate said switch, such that movement of said access cover away from said interior deactuates said switch and removes power to said circuit.

11. A security module as claimed in claim 1 further comprising a battery to supply power to said memory and a battery voltage detector to detect a low voltage in said battery and a circuit to induce the memory to lose the data stored therein when a low voltage is sensed.

12. A security module for storing sensitive data in electronic form and a memory comprising
    an enclosure for an electronic circuit including said memory and data input leads to supply the sensitive data to said memory and to allow selective outputting of data from said memory,
    a barrier within said enclosure and enclosing said memory and electrically connected with said memory such that a penetration of said barrier electrically induces said memory to lose the data stored therein, said barrier being scored to induce the breaking of said electrical connection upon a manipulation of said barrier, and
    wherein said circuit includes a connector protruding from said enclosure and a thin conductor extends behind said connector and in a circuit so that a break in said conductor will induce said memory to lose the data stored in said memory.

13. A security module as claimed in claim 11 wherein said memory is a CMOS random access memory and said battery supplies power to said CMOS random access memory.

14. A security module for storing sensitive data in electronic form and a memory comprising
    an enclosure for an electronic circuit including said memory and data input leads to supply the sensitive data to said memory and to allow selective outputting of data from said memory,
    a battery to supply power to said memory and a battery voltage detector to detect a low voltage in said battery and a circuit to induce the memory to lose the data stored therein when a low voltage is sensed, and wherein said circuit includes a connector protruding from said enclosure and a thin conductor extends behind said connector and in a circuit so that a break in said conductor will induce said memory to lose the data-stored in said memory.

15. A security module as claimed in claim 14 wherein said conductor is in a circuit with a continuity detector which causes a voltage reversal on said CMOS random access memory to cause said memory to lose the data stored therein when a discontinuity in said conductor is detected.

16. A security module as claimed in claim 11 wherein said enclosure includes a access cover and said circuit includes a switch actuated by said access cover and in a circuit such that upon deactuation of said switch by movement of said access cover to deactuate said switch, said memory is induced to lose data stored therein.

17. A security module as claimed in claim 16 wherein said enclosure is made of stainless steel.

18. A security module for storing sensitive data in electronic form in a memory comprising an enclosure for an electronic circuit including said memory and data input leads to supply the sensitive data to the memory and to allow selective outputting of data from memory, said circuit including a connector protruding from said enclosure and a thin conductor extending behind said connector and in a circuit so that a break in said conductor will induce said memory to lose the data stored in said memory.

19. A security module as claimed in claim 18 wherein said conductor is in a circuit with a continuity detector which causes a voltage reversal on said memory to cause said memory to lose the data stored therein when a discontinuity in said conductor is detected.

20. A security module for storing sensitive data in electronic form in a memory comprising:

an enclosure for an electronic circuit including said memory and data input leads to supply the sensitive data to said memory and to allow selective outputting of data from said memory, a flexible, integral barrier within said enclosure and substantially entirely surrounding said memory and electrically connected with said memory such that a penetration of said barrier electrically induces said memory to lose the data stored therein, said barrier being scored to induce the breaking of said electrical connection upon a manipulation of said barrier.

* * * * *